United States Patent [19]

Towers et al.

[11] Patent Number: 5,310,251

[45] Date of Patent: May 10, 1994

[54] ELECTRO-HYDRAULIC SERVICE & PARKING BRAKE SYSTEM

[75] Inventors: Kenneth S. Towers, Royal Oak; Daniel J. Patient, Sterling Heights, both of Mich.

[73] Assignee: AlliedSignal Inc., Southfield, Mich.

[21] Appl. No.: 87,941

[22] Filed: Jul. 6, 1993

Related U.S. Application Data

[63] Continuation of Ser. No. 962,164, Oct. 15, 1992, abandoned, which is a continuation of Ser. No. 691,935, Apr. 26, 1991, abandoned.

[51] Int. Cl.⁵ .............................................. B60T 13/22
[52] U.S. Cl. .................................. 303/11; 188/151 A
[58] Field of Search ................... 303/3, 9, 9.61, 10, 303/11, 15, 106 P; 188/151 R, 151 A, 355, 358

[56] References Cited

U.S. PATENT DOCUMENTS

| | | | |
|---|---|---|---|
| 3,777,857 | 12/1973 | Hughes | 188/106 PX |
| 3,982,792 | 9/1976 | Nakajima | 188/151 AX |
| 4,076,324 | 2/1978 | Kroth | 303/10 X |
| 4,428,620 | 1/1984 | Warwick et al. | 303/3 |
| 4,458,791 | 7/1984 | Schneider et al. | 303/10 X |
| 4,564,245 | 1/1986 | Barberis | 303/15 |
| 4,758,052 | 7/1988 | Bechman et al. | 188/151 AX |
| 4,848,852 | 7/1989 | Inoue et al. | 188/106 PX |

Primary Examiner—Robert J. Oberleitner
Assistant Examiner—Josie A. Ballato
Attorney, Agent, or Firm—Markell Seitzman

[57] ABSTRACT

In one embodiment the invention comprises a system (50; 200) for controlling service brake and parking functions of at least one wheel of a vehicle comprising: an electric motor (64) drivingly connected to a hydraulic pump (66) for pressurizing hydraulic fluid; the output of the pump communicated to at least one service brake (58a,b), comprising a first hydraulic cylinder (62a,b), an electronics circuit for controlling the speed of the motor (64) to regulate hydraulic pressure in the first hydraulic cylinder in response to operator braking activity (56, 64, 62), the motor and pump providing the primary means of service brake activation. The output of the pump is also communicated to a parking brake mechanism (30; 150), comprising a second hydraulic cylinder (34; 160), the parking brake mechanism having an activated mode of operation corresponding when the second hydraulic cylinder is unpressurized and a deactivated mode of operation corresponding when the second hydraulic cylinder is pressurized, and pressure control valves for controlling flow to and from the various hydraulic cylinders. A second variant of the system is disclosed in which only service brakes are electrohydraulically controlled.

17 Claims, 4 Drawing Sheets

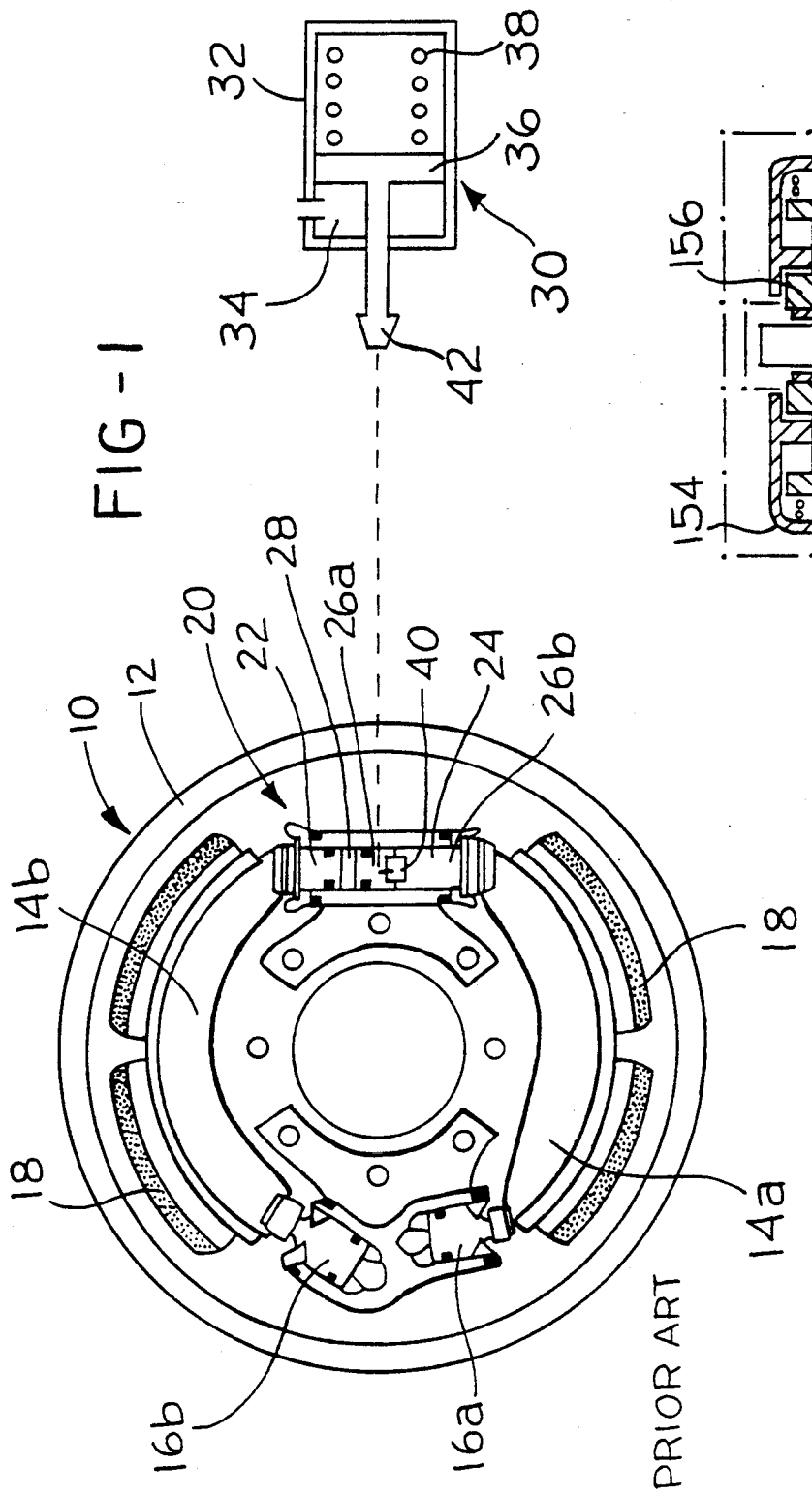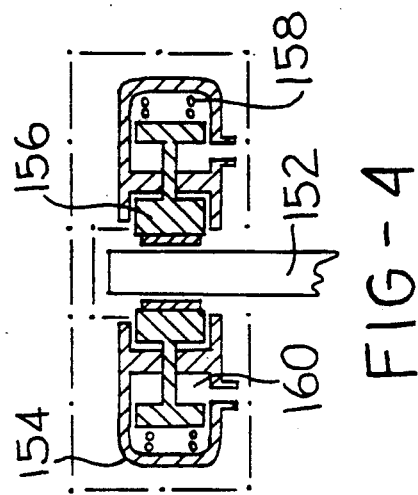

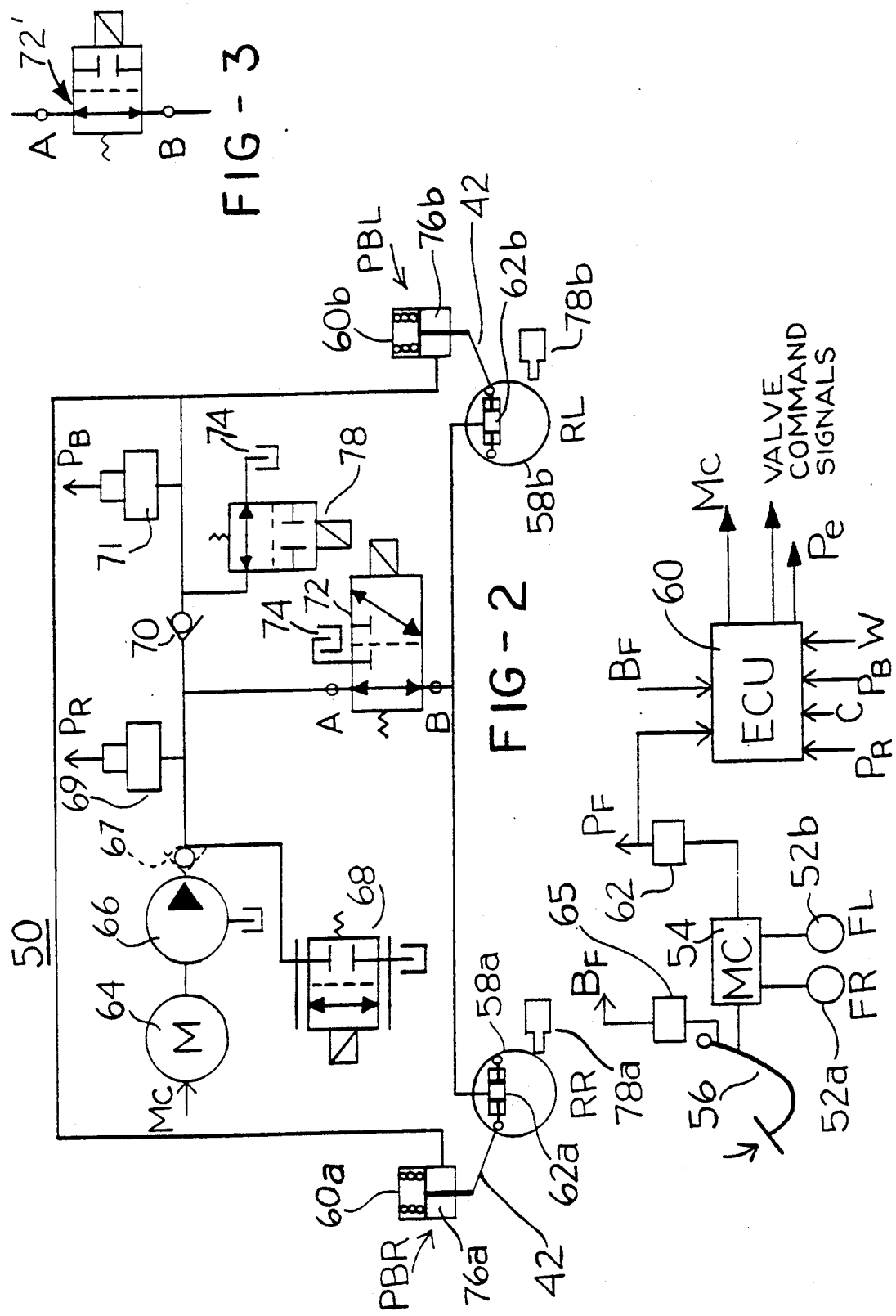

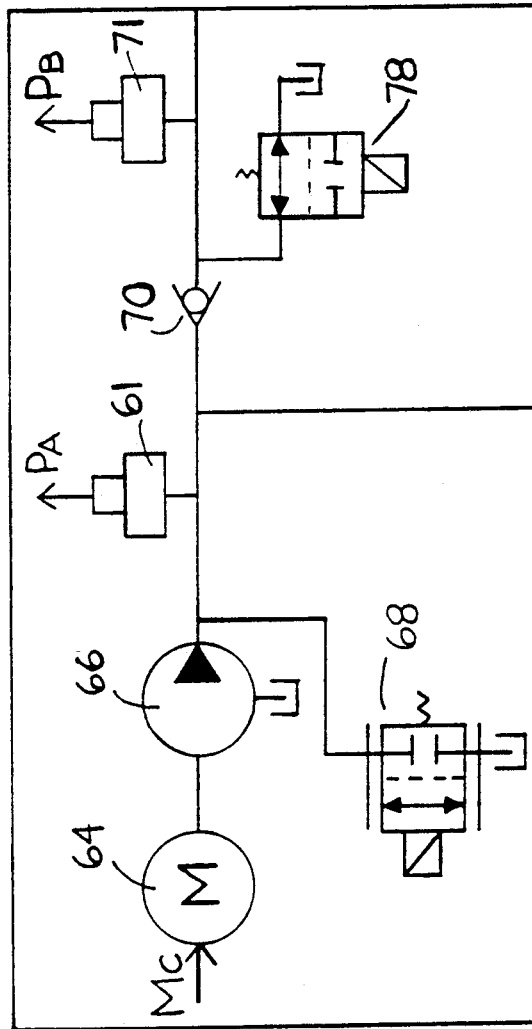
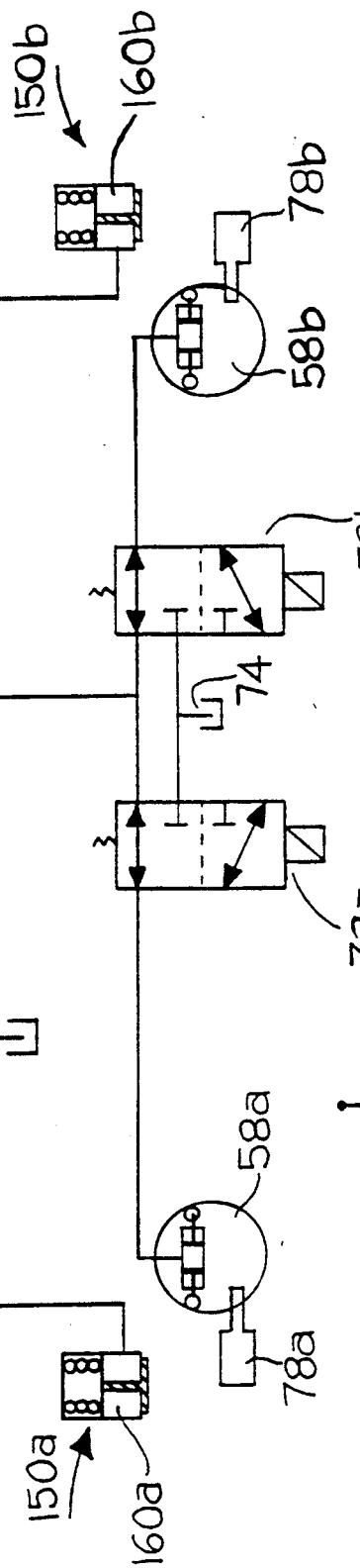

ELECTRO-HYDRAULIC SERVICE & PARKING BRAKE SYSTEM

This application is a continuation of application Ser. No. 07/962,164 filed Oct. 15, 1992, now abandoned which is a continuation of application Ser. No. 07/691,935 filed Apr. 26, 1991, now abandoned.

BACKGROUND AND SUMMARY OF THE INVENTION

The present invention relates to a service/parking brake system especially useful in medium to heavy duty vehicles.

FIG. 1 illustrates one type of a prior art service/parking brake often called an in-wheel parking brake. There is shown a drum brake 10 comprising a drum 12 having a plurality of brake shoes 14a and 14b. The left hand side of each brake shoe 14a and b is attached to a wheel cylinder/adjuster assembly 16a and 16b respectively. The gap between friction material generally shown as 18 attached to each brake shoe and move the shoes outwardly in response to hydraulic pressure. The right hand end of each brake shoe 14a and 14b is attached to a hydraulic wheel cylinder generally shown as 20. As is known in the art, this type of hydraulic wheel cylinder includes a first piston 22 and a composite piston 24 having an upper portion 26a and lower portion 26b. During normal service, brake operation hydraulic fluid is received from a master cylinder in the space 28 between the pistons 22 and 24. In response to the actuation of the brake pedal these pistons 22 and 24 are separated thereby urging the friction material 18 into the drum 12. The hydraulic cylinder 20 in cooperation with a parking brake expander 30, is used to achieve a parking brake function. The parking brake expander 30 includes a housing 32 defining therein a fluid chamber 34. Situated in the housing 32 is a piston 36 biased outwardly by a spring 38. The chamber 34 is connected to a source of fluid such as the power steering pump. Lengthy fluid-carrying lines interconnect the power steering pump to the parking brake expander 30. Depending upon the length of the vehicle underbody, these lines can be 15 to 25 feet long as they typically extend from the engine compartment to the rear axle wheels where the parking brake expander 30 is located. During normal operation, fluid from the power steering pump enters the chamber 34 thereby urging the piston 36 outwardly from a cavity 40 located within the lower piston 24. With the parking brake piston 36 operatively removed from the hydraulic piston 20, the brake 10 is operated as a normal service brake. When the engine is turned off or a parking brake switch is actuated, pressurized power steering fluid is no longer able to operate against the force of the spring 38, thereby permitting such spring to urge the piston 36, and in particular a piston or wedge 42 or other element as is known in the art, into the chamber 40 thereby urging the piston portions 26a and 26b outwardly to activate the brake 10. As a result of the motion of the piston 36 of the parking brake expander, the brake shoes are urged outwardly, thereby achieving a parking brake function within the service brake.

The type of system described above is costly in that it utilizes a dual fluid system, that is, hydraulic brake fluid to actuate the service brake and power steering fluid to activate the expander piston 36. As mentioned above, lengthy fluid lines are needed to communicate the power steering pump to the parking brake expander 30.

An object of the present invention is to provide a braking system which is electro-hydraulically actuated and more specifically to provide an electro-hydraulically operated service brake system. A further object of the present invention is to provide a service/parking brake system which utilizes a single type of fluid, namely brake fluid.

Accordingly the invention comprises: a system for controlling service brake and/or parking functions of at least one wheel of a vehicle comprising electro-hydraulic means for providing the primary means of control of the service brake and parking brake functions. The means includes an electric motor drivingly connected to a hydraulic pump for pressurizing hydraulic fluid. The output of the pump is communicated to at least one service brake. The service brake includes a first hydraulic cylinder. First means are provided for controlling the speed of the motor to regulate hydraulic pressure in the first hydraulic cylinder in response to operator braking activity. As will be seen, the motor and pump provide the primary means of service brake activation. The output of the pump is also communicated to a parking brake mechanism, comprising a second hydraulic cylinder. The parking brake mechanism has an activated mode of operation corresponding when the second hydraulic cylinder is unpressurized and a deactivated mode of operation corresponding when the second hydraulic cylinder is pressurized. The system includes means for repressurizing the parking brake mechanism when a reduction in its stored pressure is sensed.

BRIEF DESCRIPTION OF THE DRAWINGS

In the drawings:

FIG. 1 illustrates a prior art service/parking brake.

FIG. 2 illustrates a simplified service brake/parking brake system incorporating the present invention.

FIG. 3 illustrates and alternate embodiment of the present invention.

FIG. 4 illustrates an alternate parking brake mechanism.

FIG. 5 illustrates an alternate embodiment of the present invention.

FIG. 7 shows a fixed orifice device.

DETAILED DESCRIPTION OF THE DRAWINGS

Figure 6:
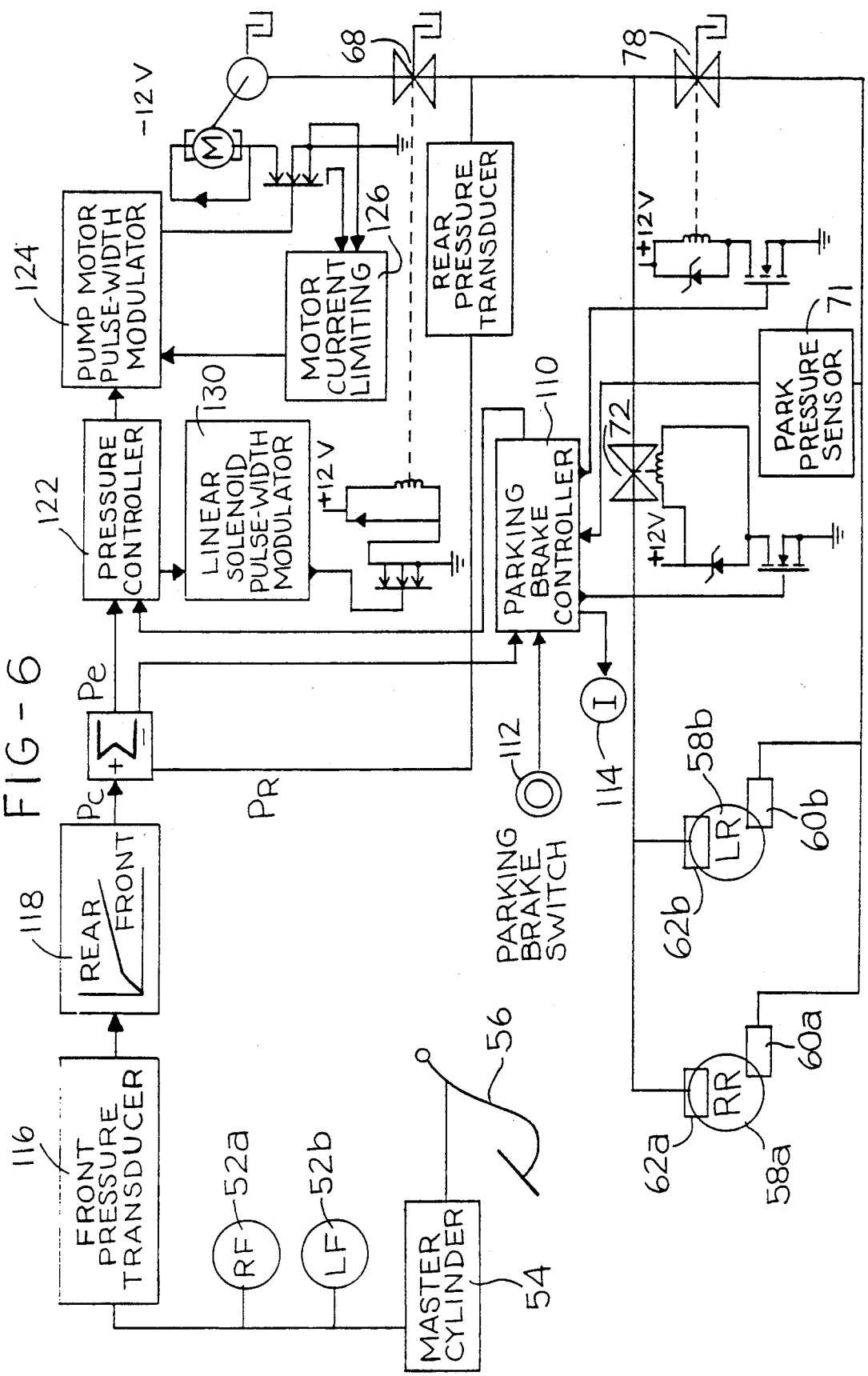
FIG. 6 illustrates a block diagram of a control system usable with the present invention.

FIG. 2 schematically illustrates a braking system 50 incorporating the teachings of the present invention. In this braking system the front brakes 52a and 52b are standard hydraulic service brakes fed through a master cylinder 54 in response to movement of the brake pedal 56. The rear service brakes 58a and 58b are controlled electro-hydraulically. An electronic control unit (ECU) 60 monitors front line brake pressure $P_F$ such as by monitoring master cylinder pressure with pressure sensor 62, or alternatively by measuring applied brake pedal effort or force through a sensor 65 coupled to the brake pedal. The ECU generates a motor control signal generally shown as $M_c$. As will be seen from the discussion below, the motor control signal $M_c$ is a function of front brake activation (pressure, effort, force, etc.) to achieve the desired front-to-rear brake proportioning.

The rear service brakes 58a and 58b are also shown schematically in FIG. 2 and may generally comprise the drum type of brake shown in FIG. 1. Also associated with these rear drum brakes are a plurality of parking brake expanders 60a and 60b generally of the type described in FIG. 1. The fluid pressure in the hydraulic cylinders 62a and/or 62b is controlled by a motor 64 and pump 66. An optional check valve 67 may be connected in series with the pump as shown. The output of the pump 66 is communicated to a proportional or continuously variable device generally shown as 68, to a check valve 70 and to an optional three-way, electrically activated valve 72. It should be appreciated that if the system does not includes a parking brake function valve 72 can be eliminated. The valve 72 communicates fluid from the pump to the hydraulic cylinders 62a and 62b of the service brakes. In the illustrated embodiment the valve 72, in the absence of control signals is in a full flow condition. Upon activation of valve 72 fluid in these hydraulic cylinders is permitted to drain to a sump 74 rapidly releasing pressure in the service brakes.

The check valve 70 is communicated to the chambers 76a and 76b of each of the parking brake expanders 60a and 60b respectively and to an electric two-way valve 78 which is also communicated to the sump 74. For improved failure mode operation, this valve 78 is normally open and is held closed by a control signal.

The following is a brief description of the operation of the system 50 shown in FIG. 2. During normal non-braking operation of system 50 the motor control signal $M_c$ is zero, and the pump 66 is inoperative. Upon actuation of the brake pedal 56 by the operator, the various front and rear brakes 52 and 58 are activated. The front brakes 52a and 52b are activated in response to the master cylinder 54 and the rear brakes, in particular the hydraulic cylinders 62a and 62b are actuated electrohydraulically. More specifically, a signal representative of brake pedal activation such as force or master cylinder pressure is supplied to the ECU 60 which compares this signal to the pressure in the rear brake line $P_r$ generated by pressure sensor 69, to generate a pressure error signal $P_e$ which is used to generate the motor command signal $M_c$. A more detailed description of the ECU is shown in FIG. 6. The motor 64 activates the pump 66 which pressurizes the hydraulic cylinders 62a and 62b to activate the rear brakes 58a and 58b. During normal braking, the valve 72, if used, is maintained in a full flow condition communicating the pump to the rear brakes as illustrated in FIG. 2. As mentioned above, the output of the pump 66 is also connected to a proportional valve 68 which, as shown, is a variable orifice, electric valve, selectively activated by the ECU to establish a leak path of predetermined size about the pump. This valve 68 could also be a hydraulic valve piloted by master cylinder pressure. By utilizing a leak path about the pump, swat leak path permits the motor/pump to continually rotate at a controlled speed to satisfy the leak rate and control pressure demands. In this manner, the motor 6⁴ and pump 66 are able to quickly respond to changes in commanded pressure since both are maintained in an active condition and delays due to inertia and starting friction are eliminated.

The device 68 is also used to reduce service brake pressure as described below. The device 68 can be replaced by a fixed orifice as opposed to the variable orifice device shown. If a fixed orifice is used, it is sized so that the motor will operate at approximately 100 percent duty cycle while the pump 66 is delivering maximum desired pressure, which is typically about 1,300 to 1,500 psi. If a fixed orifice is used, it should be appreciated that during a pressure reduction mode of operation brake pressure will reduce through the fixed orifice and through any residual pump leakage. If however, the rate of pressure decay is not adequate the valve 72 should be added to the system.

As brake pedal effort is modulated by the operator, the ECU 60 varies the motor command signal adjusting the output of the pump. When brake pedal force is reduced, requiring less service brake pressure, the various controlled valves in the system are actuated. If the system includes only the proportional orifice device 68 this valve is actuated to increase its flow area to provide a faster, controlled reduction of brake pressure. If larger and/or faster reductions in service brake pressure are required, the ECU 60 can activate valve 68 either separately or in concert with valve 72 causing a rapid reduction of brake pressure.

If the system includes the parking brake function, then, during the normal operation of the service brakes, each parking brake expanders 60a and 60b has been actuated by pump flow across the check valve 70 thereby retracting the piston or wedge 42 from the service brake, i.e., wheel cylinder 20. In addition, during normal service brake operation, the valve 78 is activated (i.e., a no-flow condition) thereby preventing the decay of pressure within the parking brake mechanisms 60a and 60b. When the vehicle is brought to a stop and the engine turned off, or parking brake is applied the valve 78 is deactivated, thereby draining fluid from the chambers 76a and 76b to the sump 74, permitting the pistons or wedge 42 to extend outwardly to again activate the service brakes 58a and 58b to achieve a parking brake function in the manner described with regard to FIG. 1.

As mentioned, the system 50 may include an electrically activated valve such as valve 72. One purpose of this valve is to relieve service brake pressure. The valve 72 is also useful to charge and recharge the parking brake expanders 60a, b. With valve 72 activated to communicate the rear brakes the sump 74, to prevent service brake application, if necessary, pump flow is communicated to the parking brake expanders 60a, b through check valve 70. The pressure in the expanders 60a, b, as sensed by sensor 71 is increased to a set pressure (valve 78 is in a no-flow condition) to a level to retract the pistons 36 from the hydraulic cylinder 20. When this set pressure is reached, the valve 72 is returned to its normal flow condition for service brake operation. If during the operation of the vehicle, the pressure in the parking brake reduces below its desired or set pressure because of leakage or other cause (and during a period when the service brakes are not applied), the valve 72 is again switched to a no-flow condition diverting pump 66 flow to the parking brake expanders 60a and 60b to increase the pressure in the parking brake lines thereby recharging the parking brake(s).

An alternate embodiment of the system is shown is FIG. 3. In this embodiment the three way valve 72 is replaced with a two-way valve 72'. When activated this valve 72' also blocks communication with the pump 66.

A variant of the system shown in FIGS. 2 or 3 can be achieved in view of the discussion below. In the above description of the system 50 the pump is rotated during brake apply periods to eliminate any effects of leakage, inertia and/or friction. While the system exhibits the desired characteristic of rapid performance, it does drain power from the vehicle while the service brakes are applied. This power drain may be more evident when the vehicle is stopped and at idle. The following describes an alternate embodiment of the invention in which the optional check valve 67 is utilized and the device 68 is a variable orifice or proportional valve. In this alternate embodiment the application of the brakes is identical to that described above with the following exceptions. When it is desired to reduce rear service brake pressure the variable orifice valve 68 is controlled by the ECU 60 to present an effectively greater orifice than used during brake pressure build operation. This greater opening permits fluid in the hydraulic cylinders 62a and b to bleed to the sump 74. Another difference in the operation of this alternate embodiment occurs when the vehicle is at a stop as sensed, for example, by the wheel speed sensors 78a and b. In this condition, the variable orifice 68 device is commanded to be in a closed no-flow condition, thereby preventing decrease of rear brake pressure. If the variable orifice device 68 is replaced with a fixed orifice device 68', such as that shown in FIG. 7, and the system uses valve 72' this valve is closed (no-flow). Reverse flow of brake fluid through the pump 66 is prevented by use of the optional check valve 67, which can be part of the pump 66. In addition, when the vehicle is stopped, the ECU 60 will command the motor 64 to zero speed thereby reducing the parasitic loss due to the motor and pump. Even with the pump 66 stopped, the electro-hydraulically controlled rear brakes 58 will still be applied as brake pressure cannot reduce because of the check valve 67 and the closed control valves 68 or 72'.

Reactivation of the motor, in preparation for the next braking cycle, can be achieved by monitoring a change of brake pedal force. As many medium and heavy duty trucks often utilize a manual transmission, the motor reactivation signal can alternatively be generated in response to monitoring clutch pedal motion by an appropriate sensor to generate a control signal, shown as C, which is communicated to the ECU 60.

It should be appreciated that the in-wheel parking brake shown in FIG. 1 is not the only configuration of service brake and parking brake usable with the present invention. As an example, hydraulic service brakes can be used for normal braking and the parking brake function can be achieved by a hydraulic drive train brake or separate, per wheel or axle disk brake. It is envisioned that a drive train parking brake would utilize a drum brake in which the drum is attached to the rotating drive train and the brake shoes attached to a stationary member. By way of illustration, reference is briefly made to FIG. 4 which illustrates an alternate parking brake mechanism such as a disk parking brake 150 usable with the present invention. Each disk parking brake 150 comprises a disk 152 and hydraulic cylinder 154 comprising a piston 156 (carrying friction material), spring 158 and hydraulic chamber 160. The brake caliper is shown in phantom lines. To achieve the parking brake function, fluid in chamber 160 is permitted to drain thereby permitting the piston 156 to be activated by spring 158 to hold the disk 152 in a manner not unlike the in-wheel brake of FIG. 1. Upon pressurization of the cylinder 154 the piston moves inwardly, thereby releasing the disk 152.

FIG. 5 illustrates a braking system 200 incorporating two disk parking brake 150a and 150b and also shows the use of two (2) three-way valves 72. The system 200 could also use the two two-way valves 72'. The operation of this system is identical to system 50. The operation of the parking brake is essentially as described above. Upon termination of the motor control signal the valve 78 is opened thereby reducing fluid pressure in the chambers 160a,b which permits the associated spring 158 to urge the piston 156 against the disk 152.

FIG. 6 illustrates a block diagram of a control system usable with the present invention. It illustrates many of the major components of the ECU 60. Upon start up of the engine, or alternatively, on application of the brake pedal 56, the parking brake controller 110 will interrogate the parking brake pressure sensor 71 and apply/release switch 112. If the output of the pressure sensor 71 is approximately zero or some relatively low number, the parking brake controller 110 will activate an indicator such as 114 informing the driver that the parking brakes 60a and b are applied. Upon receipt of an activation signal from the apply/reapply parking brake switch 112, the parking brake controller will activate valve(s) 72 (or two-way valve 72') causing same to switch to its no-flow condition. Similarly, valve 78 is switched to its no-flow condition. Thereafter, the parking brake controller 110 generates a parking brake pressure command signal which is compared to the output of the pressure sensor 71 forming a parking brake error signal which is used to activate the motor 64, thereby causing pump 66 to build pressure in the parking brake hydraulic cylinders such as 76a and b or 160a and b. After the pressure in such cylinders has reached the desired level, the error signal is zeroed and the motor 64 stopped.

With the parking brakes now off and when the brake pedal 56 is applied, brake pressure will increase in the hydraulic front brakes 52a and b, such pressure being sensed by a front pressure sensor 116. Alternatively, rather than measuring pressure directly a brake force sensor 65 can be used. The output of this pressure sensor 116 or sensor 64 is manipulated using an electronic proportioning table or curve fit 118 to generate the rear pressure control or command signal, which is compared to the actual pressure in the rear service brakes to generate a pressure error signal which is communicated to a pressure controller 122. The pressure controller 122 may include a proportional-integral-differential controller, the output of which is input to a pulse width modulating circuit 124 of known variety. The pressure controller 122 may also include logic used to activate/deactivate certain valves. Current limiting circuitry 126 may also be used to protect the motor 64. In operation, the speed of the motor and pump will essentially be controlled to drive the error signal $P_e$ to zero.

During intervals when the operator reduces brake pedal effort, thereby reducing the pressure command signal $P_c$, it can be seen that the error signal $P_e$ will become negative. This negative going error signal will essentially drive the motor command signal $M_c$ to zero, thereby permitting the pressure within the service brake wheel cylinders 60a and b to reduce.

As mentioned above, the valve 68 may be a linear or proportional solenoid or a fixed orifice. If the required pressure decay is relatively small, brake pressure will decay through the fixed orifice through nominal opening of the proportional orifice 68 or through any internal pump leakage paths. If a more rapid decrease in the service brake pressure is required, a pressure controller 122 or parking brake controller 110 will command the valve(s) 72 to its switched condition thereby communicating the hydraulic cylinders to the sump 74. As mentioned above, if the valve 72 is not included in the system, pressure decay in the service brake hydraulic cylinders can be achieved only by increasing the size of the orifice of the proportional valve 68 (if used) with appropriate control of a linear solenoid pulse width modulator 130 in response to the output of the pressure controller 122.

If during the normal operation of the vehicle, the parking brake controller 110 detects a decrease in the pressure of the hydraulic cylinders 76a and b associated with the parking brake, and if the brake pedal 56 is not applied, the parking brake controller 110 will initiate action to cause the valve 72 (or 72') to communicate with the sump 74 and activate motor 64, thereby recharging the pressure within the parking brake hydraulic cylinders.

Many changes and modifications in the above described embodiment of the invention can, of course, be carried out without departing from the scope thereof. Accordingly, that scope is intended to be limited only by the scope of the appended claims.

We claim:

1. A system (50; 200) for controlling service brake function of at least one wheel of a vehicle comprising:

electro-hydraulic means for providing a primary means of control of pressure build in a service brake, the electro-hydraulic means comprising:

an electric motor (64) drivingly connected to a hydraulic pump (66) for pressurizing hydraulic fluid; wherein the pump is communicated to at least one service brake (58a,b), comprising a hydraulic cylinder (62a,b), first means for controlling the speed of the motor (64) in proportion to operator braking activity (56, 65, 62), the motor and pump providing a primary source of pressurized fluid for service brake activation; and flow means (68) for providing a variable area flow path through which a portion of hydraulic fluid exiting the pump (66) is communicated to a drain (74) so that when activated the motor and pump will continuously operate during times of pressure build in a manner to supply fluid through the variable area flow path as well as to activate the hydraulic cylinder and the flow means also providing a flow path to drain the hydraulic cylinder.

2. The system as defined in claim 1 wherein the variable flow area is increased, in response to a control signal, to enable a controlled decrease of the pressure in the hydraulic cylinder.

3. The system as defined in claim 2 wherein the pressure control means includes isolation valve means (72) between the flow means and hydraulic cylinder (62a,b), the isolation valve means including a first mode of operation connecting the pump (66) to the first hydraulic cylinder and a second mode in which flow to the hydraulic cylinder is prohibited.

4. A system (50; 200) for controlling service brake and parking functions of at least one wheel of a vehicle comprising:

electro-hydraulic means for providing the primary means of control of pressure build in a service brake and parking brake, the electro-hydraulic means comprising:

an electric motor (64) drivingly connected to a hydraulic pump (66) for pressurizing hydraulic fluid; pump output being communicated to at least one service brake (58a, b), comprising a first hydraulic cylinder (62a,b), first means for controlling motor (64) speed to regulate hydraulic pressure in the first hydraulic cylinder in response to operator braking activity (56, 64, 62), the motor and pump providing the primary means of service brake activation;

the output of the pump also communicated to a parking brake mechanism (30; 150), the parking brake mechanism comprising a second hydraulic cylinder (34; 160), the parking brake mechanism having an activated mode of operation corresponding when the second hydraulic cylinder is unpressurized and a deactivated mode of operation corresponding when the second hydraulic cylinder is pressurized, and pressure control means for controlling flow to and from the first and second hydraulic cylinders to activate and deactivate the parking brake mechanism and service brake wherein the pressure control means (60, 68, 72, 74) includes:

flow means (68) for providing a flow path through which a portion of the output of the pump (66) is communicated to a drain (74) wherein as a result of the flow path to the drain the pump continually operates to provide the pressure needed in the service brake;

a first check valve (70) interconnecting the pump (66) with the second hydraulic cylinder (34;160); and a control valve (78) connecting the second hydraulic cylinder to the drain (74), the control valve (78) having a closed mode of operation to permit pressure build in the second hydraulic cylinder.

5. The system as defined in claim 4 wherein the pressure control means includes isolation valve means (72) for communicating fluid to and from the first hydraulic cylinder (62a,b), the isolation valve means having a first mode of operation in which it connects the pump (66) to the first hydraulic cylinder and a second mode in which the first hydraulic cylinder is connected to the drain (74).

6. The system as defined in claim 5 wherein the pressure control means (60, 68, 72, 74), in conjunction with the pump (66), is operative to pressurize the second hydraulic cylinder during periods when service braking is not required, wherein such pressurization is accomplished by causing the isolation valve means (72) to block pump flow to the first hydraulic cylinder enabling pump flow to fill the second hydraulic cylinder to a desired pressure sufficient to place the parking brake in its deactivated mode.

7. The system as defined in claim 6 wherein the pressure control means includes a first pressure sensor (71) for measuring the pressure in the parking brake mechanism (30;150) and electric control means (60) responsive to an output of the first pressure sensor (71) for causing the isolation valve means (72) to return to the first mode when the desired pressure is achieved and including second means to deactivate the motor (64) when such desired pressure is achieved.

8. The system as defined in claim 7 wherein the electric control means (60) includes third means, responsive to a signal indicative of the desirability to activate the parking brake mechanism, for generating a control signal to cause the control valve (78) to open and drain fluid from the second hydraulic cylinder reducing the pressure therein permitting the parking brake mechanism to enter its activated mode of operation.

9. The system as defined in claim 5 wherein the pressure control means includes a second pressure sensor (69) for measuring service brake pressure and includes electric control means (60) responsive to a signal indicative of operator desired braking effort, for activating the motor and pump to pressurize the first hydraulic cylinder to a pressure which corresponds to the desired braking effort.

10. The system as defined in claim 9 wherein during service brake pressurization, the flow means presents an orifice having a size which is chosen so that the pump will deliver maximum desired pressure to the first hydraulic cylinder when the motor (64) is operated at a duty cycle of approximately 100 percent.

11. The system as defined in claim 10 wherein the orifice is a fixed orifice.

12. The system as defined in claim 11 wherein during periods when pressure in the first hydraulic cylinder is reduced from a previous pressure level fluid in such cylinder flows to the drain (74) through the orifice means.

13. The system as defined in claim 9 wherein the flow means is a continuously variable orifice (68) such that during a pressure build condition in the service brake a lesser amount of fluid is diverted through the continuously variable orifice (68) during periods of pressure build than when such orifice is operated to permit a decrease in pressure.

14. The system as defined in claim 11 wherein the orifice is a variable orifice device and wherein the size of the orifice is increased during pressure decay periods to reduce a time necessary to decay pressure in the first hydraulic cylinder.

15. The system as defined in claim 14 wherein the isolation valve means (72a,b) is movable to the second mode to reduce pressure in the first hydraulic cylinder during a period of reduced pressure need.

16. The system as defined in claim 4 wherein a second check valve (67) interposes the pump (66) and the flow means (68), the flow means being a continuously variable valve defining an orifice of determinable size capable of varying the size of such orifice in response to a control signal such that when desired the flow means is in a no-flow condition to prevent a decrease in service brake pressure and wherein the second check valve (67) prevents a reversal of fluid flow through the pump (66).

17. A system (50; 200) for controlling service brake and parking functions of at least one wheel of a vehicle comprising:

electro-hydraulic means for providing the primary means of control of pressure build in a service brake and parking brake, the electro-hydraulic means comprising:
   an electric motor (64) drivingly connected to a hydraulic pump (66) for pressurizing hydraulic fluid; pump output being communicated to at least one service brake (58a,b), comprising a first hydraulic cylinder (62a,b), first means for controlling motor (64) speed to regulate hydraulic pressure in the first hydraulic cylinder in response to operator braking activity (46, 64, 62), the motor and pump providing the primary means of service brake activation;

the output of the pump also communicated to a parking brake mechanism (30; 150), the parking brake mechanism comprising a second hydraulic cylinder (34; 160), the parking brake mechanism having an activated mode of operation corresponding when the second hydraulic cylinder is unpressurized and a deactivated mode of operation corresponding when the second hydraulic cylinder is pressurized, and pressure control means, comprising an isolation valve means (72), for controlling flow to and from the first and second hydraulic cylinders to activate and deactivate the parking brake mechanism and service brake, wherein the pressure control means (60, 68, 72, 74), in conjunction with the pump (66), is operative to pressurize the second hydraulic cylinder during periods when service braking is not required, wherein such pressurization is accomplished by causing the isolation valve means (72) to block pump flow to the first hydraulic cylinder enabling pump flow to fill the second hydraulic cylinder to a desired pressure sufficient to place the parking brake in its deactivated mode, wherein the pressure control means includes a first pressure sensor (71) for measuring the pressure in the parking brake mechanism (30;150) and electric control means (60) responsive to an output of the first pressure sensor (71) for causing the isolation valve means (72) to return to a mode connecting the pump to the first hydraulic cylinder when the desired pressure is achieved and including second means to deactivate the motor (64) when such desired pressure is achieved wherein the electric control means (60) includes means, responsive to a signal indicative of the desirability to activate the parking brake mechanism, for generating a control signal to cause a control valve (78), connecting the second hydraulic cylinder to drain, to open and drain fluid from the second hydraulic cylinder reducing the pressure therein permitting the parking brake mechanism to enter its activated mode of operation; and wherein the electric control means is operated to monitor parking brake pressure and if such pressure reduces below the desired pressure during a period that the parking brake function is desired to be maintained in its deactivated mode, but when no service brake operation is required, the electric control means is operative to cause the isolation valve means (72a,b) to block communication to the first hydraulic cylinder, activate the motor (64) and pump (66) to recharge parking brake pressure to the desired pressure.

* * * * *